United States Patent [19]

Höfle

[11] Patent Number: 5,193,769
[45] Date of Patent: Mar. 16, 1993

[54] VERTICALLY ADJUSTABLE PIPE HANGER

[75] Inventor: Siegfried Höfle, Götzis, Austria

[73] Assignee: Hilti Aktiengesellschaft, Liechtenstein

[21] Appl. No.: 850,398

[22] Filed: Mar. 11, 1992

[30] Foreign Application Priority Data

Mar. 15, 1991 [DE] Fed. Rep. of Germany ....... 4108433

[51] Int. Cl.[5] ............................................. E21F 17/02
[52] U.S. Cl. ....................................... 248/59; 248/62
[58] Field of Search .................... 248/58, 59, 60, 61, 248/62, 74.1, 68.1

[56] References Cited

U.S. PATENT DOCUMENTS

| 552,986 | 1/1896 | Carll | 248/62 |
| 867,760 | 10/1907 | Schang | 248/62 |
| 4,473,205 | 9/1984 | Rumble | 248/58 |
| 4,809,601 | 3/1989 | Sandstrom | 248/58 |
| 5,082,216 | 1/1992 | Roth | 248/58 X |

FOREIGN PATENT DOCUMENTS 284819  4/1967  Australia .................................. 248/58

Primary Examiner—J. Franklin Foss
Attorney, Agent, or Firm—Anderson Kill Olick & Oshinsky

[57] ABSTRACT

A vertically adjustable pipe hanger includes an elongated strip-shaped member (1), and a threaded rod (2) carrying a lock nut (3) and a stop nut (4). The strip-shaped member (1) is bent to form a retaining loop section with bent off first and second end sections (1b, 1c), one superimposed on the other and forming a closure for the retaining loop. All of the tensile forces are carried by a projection (1f) on the first end section (1b) in engagement with a folded section (1g) of the second end section. The first and second end section (1b, 1c) are clamped together by the lock nut (3) and stop nut (4) and release of the interengagement of the projection (1f) and the folded section (1g) is prevented.

7 Claims, 1 Drawing Sheet

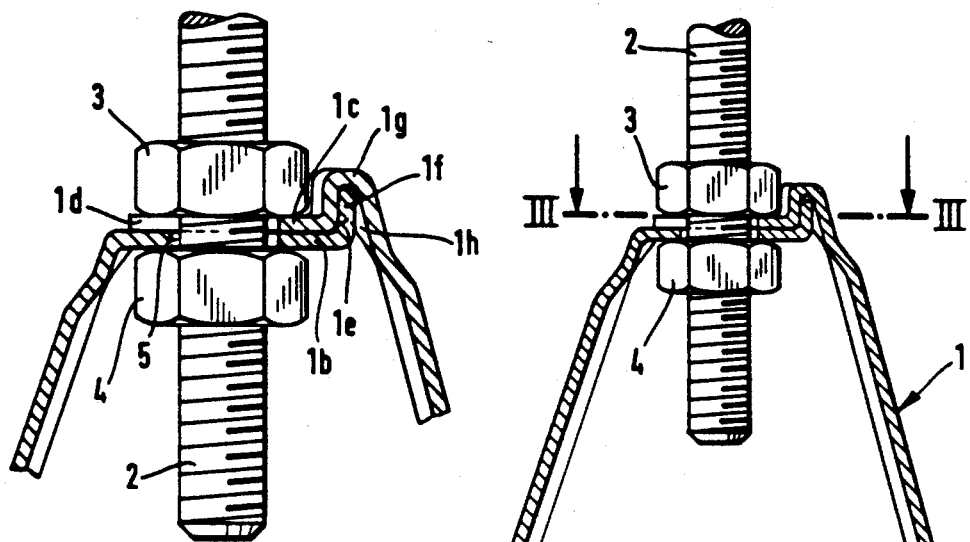
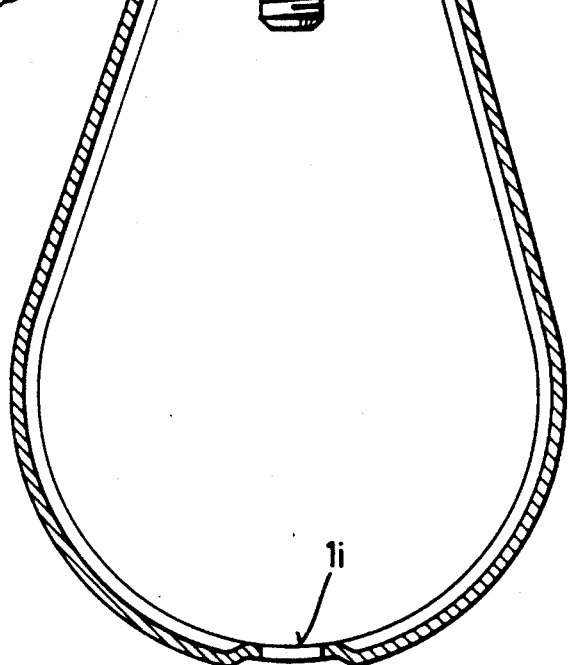
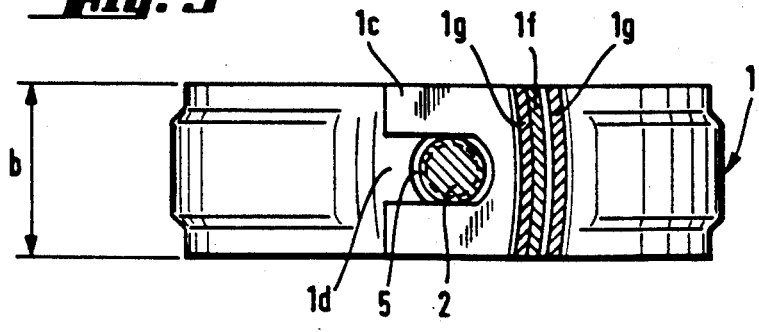

5,193,769

VERTICALLY ADJUSTABLE PIPE HANGER

BACKGROUND OF THE INVENTION

The present invention is directed to a vertically adjustable pipe hanger with a threaded rod equipped with a stop nut and a lock nut and a strip-shaped member forming a retaining loop with bent-off end sections arranged with one superimposed on the other. One of the end sections has a through opening and the other has a slot-like opening extending inwardly from its free end so that the threaded rod extends through the openings. An angled projection is formed at the end of one of the end sections and cooperates with a stop edge located on the other end section.

Pipe hangers or suspensions of the type described above are known for hanging pipes or the like from walls or ceilings. As an example, DE-OS 2 309 464 shows a pipe hanger made up of a holding or retaining loop formed of a band or strip with an upwardly extending part at one end and with a window at the other end so that the extension fits into the window when one end is superimposed on the other.

To fabricate an upwardly extending projection of the known type, a sufficiently large contact face must be present in the long direction of the band upstream and downstream of the projection, so that an appropriate stamping can be performed. In addition, the strip is made wider in this end region. The excess width is bent off at right angles to the inside of the band on both sides in an additional work step after the stamping process is completed.

This type of fastening of the end sections is complicated and technically cumbersome in this known pipe hanger. Further, the relatively narrow upwardly extending projection can carry only small tensile forces, whereby a large portion of the tensile forces must be carried through the clamp by means of both nuts.

SUMMARY OF THE INVENTION

The present invention provides a simple pipe hanger with the end sections of the retaining loop affording an interengagement capable of carrying high tensile forces.

In the present invention a projection is formed by one of the end sections of the retaining loop and the projection is bent at right angles to the end section and fits against a stop edge formed by a folded part of the other end section.

The projection formed in this manner provides for shorter end sections. Accordingly, additional reinforcement ribs acting against bending are unnecessary. The folded part forming the stop edge enables the interengagement of the projection when the end sections are superimposed one on the other. All of the tensile forces can then be carried by the interengagement of the end sections, so that the clamping together of both end sections by means of two nuts merely prevents the loosening or release of the interengagement.

Moreover, the interengagement is arranged in such a way that it can carry all of the tensile forces which develop with a constant width of the strip-shaped member forming the retaining loop.

Preferably, the projection of the end section extends across the entire width of the strip-shaped member forming the retaining loop. This feature achieves a uniform distribution of the forces across the entire width of the strip-shaped member and the stability of the projection is considerably increased.

The folded part of the other end section extends appropriately across the entire width of the strip-shaped member. As a result, a wider stop edge is provided for the projection on the one end section.

In a preferred embodiment, the stop edge is located in a concave region of the folded part and this region extends essentially parallel to the axis of the threaded rod. Accordingly, the side of the concave region closer to the threaded rod forms the stop edge against which the angled projection can be engaged. The width of the opening of the concave region is slightly greater than the thickness of the strip-shaped member forming the retaining loop. Advantageously, the opening of the concave region in the folded part faces the interior of the retaining loop. This arrangement affords a better diversion of the tensile forces occurring in the long direction of the strip-shaped member.

The projection of the one end section and the folded part of the other end section are arranged on a radius emanating from the same center thereby affording greater twisting stability of the entire retaining loop in the region where it is suspended. To prevent turning of the end sections relative to one another when the lock nut is tightened, a lug can be arranged in the concave region for engagement in a recess in the end face of the projection. Another possibility for preventing such turning is to provide a tapered section in the region of the projection for engagement into a recess in the folded part of the other end section.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 is a vertically extending partial sectional view of a vertically adjustable pipe hanger embodying the present invention;

FIG. 2 is a partial enlarged view illustrating details of the tube pipe hanger shown in FIG. 1; and FIG. 3 is a sectional view through the pipe hanger taken along the line III—III in FIG. 1 and shown without the lock nut.

DETAILED DESCRIPTION OF THE INVENTION

A vertically adjustable pipe hanger is displayed in FIGS. 1 and 2 and comprises a strip-shaped member forming a retaining loop 1 with first and second end sections 1b, 1c bent off from the opposite ends of the retaining loop 1 and disposed one superimposed on the other. An opening 5 extends through the first end section 1b spaced from its free end. Second end section 1c has a slot-like opening 1d extending inwardly from its free end, note FIG. 3. First end section 1b has a projection 1f at its free end and the projection bears against a stop section 1e of the second end section 1c. Projection 1f is disposed substantially perpendicularly to the remainder of the first end section 1b. The stop section 1e is formed by a folded section 1g of the second end section 1c. The folded section 1g forms an interior concave recess 1h directed toward the interior of the retaining loop 1. The folded section 1g is basically U-shaped. The width of the concave recess 1h, that is the dimension extending transversely of the axial direction of the rod 2, is slightly larger than the thickness of the strip-shaped member forming the retaining loop 1.

The lock nut 3 and the stop nut 4 serve to locate the position of the retaining loop on the threaded rod 2 and these nuts are commercially available hexagonal nuts. Threaded rod 2 is fixed to a wall or ceiling by a connection, not shown. By turning the nuts 3, 4 the position of the retaining loop in the axial direction of the threaded rod 2 can be established. Accordingly, it is possible to accurately align a pipe supported by the retaining loop, however, the pipe is not shown in the drawing.

In transverse cross-section, the strip-shaped member forming the retaining loop 1 has a reinforcement rib pressed outwardly relative to the interior of the retaining loop 1 The reinforcing rib extends between the first and second end sections 1b, 1c in the elongated direction of the strip-shaped member.

A weakened region 1i is located in the retaining loop 1 at the bottom of the loop as viewed in FIG. 1, that is, opposite the threaded rod 2 or intermediate the first and second end sections 1b, 1c. The weakened region 1i serves to facilitate opening of the retaining loop 1. Weakened region 1i is formed by a through opening which weakens the cross-section of the strip-shaped member. As a result, an exact superposition of the second end section 1c on the first end section 1b is possible when the opening retaining loop 1 is returned to the closed position.

FIG. 3 is a sectional view through the pipe hanger as shown by the line III—III in FIG. 1 and without the lock nut 3. The angularly bent projection 1f of the first end section 1b is shown in section as well as the folded section 1g of the second end section 1c. The projection 1f and the folded section 1g are arranged on a radius having the same center.

The projection 1f of the first end section 1b and the folded section 1g of the second end section 1c each extend for the entire width b of the strip-shaped member forming the retaining loop 1, note FIG. 3.

The slot-like opening 1d has a width slightly greater than the diameter of the threaded rod 2.

With the retaining loop in the closed position the first and second end sections 1b, 1c are tightened by means of the stop nut 4 and the lock nut 3 and there is the possibility that the first and second end sections 1b, 1c may turn relative to one another. Accordingly, a lug can be arranged in the concave recess 1f for engaging a free end recess of the bent projection 1f on the first end section 1b. Another possibility for preventing turning of the first and second end sections 1b, 1c involves providing a tapered face on the free end of the projection 1f for engagement into a recess in the region of the fold 1g.

The forces due to the weight of the supported pipe are conveyed through the strip-shaped retaining loop to the region of the threaded rod 2. The full tensile forces developed are carried by the angularly disposed projection 1f and the folded section 1g.

While specific embodiments of the invention have been shown and described in detail to illustrate the application of the inventive principles, it will be understood that the invention may be embodied otherwise without departing from such principles.

I claim:

1. A vertically adjustable pipe hanger comprising an elongated strip-shaped member forming a retaining loop (1) including a loop section (1) for holding a pipe and said loop section having a first end section (1b) with a first free end and a second end section (1c) with a second free end, said first and second end sections are bent off relative to said loop section with one of said first and second end sections superimposed on the other and forming in combination a closure for said retaining loop, said first end section (1b) has an opening therethrough (5), said second end section has a slot-like opening (1d) extending inwardly from the second free end in the elongated direction of said strip-shaped member, said first end section has a projection (1f) and said projection cooperates with a stop section (1e) of said second end section (1c), wherein the improvement comprises that said first and second end sections one superposed on the other are arranged opposite and in parallel relation for portions thereof extending in the elongated direction, said projection (1f) extends in the elongated direction of said strip-shaped member from the first free end and is disposed approximately perpendicularly relative to said first end section portion arranged opposite and in parallel relation with said second end section, said portions contain the opening (5) and the slot-like opening (1d), and said stop section (1e) is formed by a folded section (1g) of said second end section spaced in the elongated direction of said top-shaped member from said second free end opposite said projection and out of the range of said portions of said first and second end sections whereby the projection extends into the folded section, wherein said strip-shaped member has a width extending transversely of the elongated direction thereof and said projection (1f) of the first end section (1b) has a width the same as the strip-shaped member, and the folded section (1g) of the second end section (1c) has a width the same as the width of the strip-shaped member.

2. A vertically adjustable pipe hanger, as set forth in claim 1, wherein the folded section (1g) of the second end section (1c) has a width the same as the width of the strip-shaped member.

3. A vertically adjustable pipe hanger, as set forth in claim 1, wherein said folded section (1g) has a concave region (1h) and said stop section (1e) is located within the concave region (1h) of the folded section (1g).

4. A vertically adjustable pipe hanger, as set forth in claim 3, wherein said concave region (1h) of the folded section (1g) is directed toward the interior of said retaining loop (1b).

5. A vertically adjustable pipe hanger forth in claim 3, wherein said concave region (1h) of said folded section (1g) has a base, and the first free end on said projection (1f) is located at the base of said concave region (1h) and the free end of said projection (1f) and the base of said concave region (1h) lie on a radius having the same center.

6. A vertically adjustable pipe hanger, as set forth in claim 1, wherein said strip-shaped member forming said retaining loop (1) has a reinforcing rib extending in the elongated direction of said strip-shaped member extending outwardly from said retaining loop and extending from an end of said first end section (1b) connected to said loop section to an end of said second end section (1c) connected to said loop section.

7. A vertically adjustable pipe hanger, as set forth in claim 1, wherein said retaining loop has a weakened section (1i) spaced approximately midway between said first and second end section (1b, 1c).

* * * * *